| United States Patent [19] | [11] Patent Number: 4,714,835 |
| Brogårdh et al. | [45] Date of Patent: Dec. 22, 1987 |

[54] OPTICAL POSITION-MEASURING SENSOR

[75] Inventors: Torgny Brogårdh; Bertil Hök; Christer Ovren, all of Västerås, Sweden

[73] Assignee: ASEA Aktiebolag, Västerås, Sweden

[21] Appl. No.: 795,742

[22] Filed: Nov. 6, 1985

Related U.S. Application Data

[63] Continuation of Ser. No. 486,118, Apr. 18, 1983, abandoned.

[30] Foreign Application Priority Data

Apr. 21, 1982 [SE] Sweden ................................ 8202484

[51] Int. Cl.⁴ .......................... G01D 5/26; G01J 3/443
[52] U.S. Cl. ................................ 250/486.1; 250/227; 250/231 P; 73/800
[58] Field of Search ............... 250/227, 231 R, 231 P, 250/486.1, 367, 368; 356/32; 73/777, 800

[56] References Cited

U.S. PATENT DOCUMENTS

| 2,501,560 | 3/1950 | Blau | 250/363 R |
| 3,994,009 | 11/1976 | Hartlaub | 73/777 |
| 4,451,730 | 5/1984 | Brogardh et al. | 250/227 |
| 4,473,747 | 9/1984 | Brogardh et al. | 250/231 R |
| 4,562,348 | 12/1985 | Brogardh et al. | 250/231 P |

*Primary Examiner*—Carolyn E. Fields
*Attorney, Agent, or Firm*—Watson, Cole, Grindle & Watson

[57] ABSTRACT

An optical position-measuring sensor has a monolithic structure which includes at least two masses of photoluminescent material, which on excitation emit photoluminescent light with non-identical spectra. The at least two masses are supported in the sensor by a resilient part (e.g. a beam or diaphragm), the deflection of which determines the wavelength distribution of the luminescent light which is coupled into an optical wave conductor (e.g. a light fiber) terminating in the sensor.

16 Claims, 5 Drawing Figures

OPTICAL POSITION-MEASURING SENSOR

This application is a continuation of application Ser. No. 486,118, filed Apr. 18, 1983, now abandoned.

TECHNICAL FIELD

The present invention relates to an optical position-measuring sensor which utilizes an optical wave conductor for conducting light to and from the sensor. The sensor includes a movable photoluminescent body, the movement of which is sensed (e.g. at a remote location) by a monitoring of some property of the luminescent light emitted by the body into the wave conductor. By ensuring that the movement of the body of luminescent material is influenced by changes in some physical quantity to be measured, a sensing device for that physical quantity is provided.

Throughout this specification the term "light" will be used to denote electromagnetic radiation in the vicinity of the visible spectrum, but it should be understood that the term includes electromagnetic radiation in the infrared and ultraviolet regions.

DISCUSSION OF PRIOR ART

It has already been proposed to monitor changes in a physical quantity such as position, speed, acceleration, force, pressure, length or temperature by means of an optical measuring device which comprises at least one optical fiber for conducting light between an electronic unit having detector/signal processing means and a luminescent sensor. One known sensor comprises a member having at least one luminescent material, the position of the member(s) relative to an adjacent end of the optical fiber being influenced by the physical quantity to be measured, so that an optical output signal from the sensor becomes dependent on the quantity to be measured. U.S. patent application Ser. No. 218,949 (filed on the Dec. 22, 1980 by Brôgardh and Ovrén and assigned to the assignee of this application) describes a position sensor which relies on positionchanges displacing two luminescent bodies which, by photoluminescence, emit light in two separate parts of the electromagnetic spectrum, i.e. relative to an adjacent end surface of an optical fiber. The wavelength distribution of the luminescent light which is thereby coupled into the fiber is thus determined by the position change of the bodies, and this position change can be detected at a remote location by a suitable detector analyzing the light output from the sensor, thereby providing an indication of the change in the physical quantity that occasioned the position change.

BRIEF STATEMENT OF THE INVENTION

The present invention represents an improvement in the above-described sensor for measuring changes in pressure, position and force, etc. The invention is characterized in that the sensor is based on the use of a monolithic structure comprising at least two masses of photoluminescent material, which on excitation emit luminescent light with non-identical spectra. The sensor includes a resilient portion in the form of a diaphragm or a beam structure which supports the masses having different luminescence properties. Any deflection of the resilient portion affects the wavelength distribution of the luminescent light which is coupled into an optical wave conductor defining an output from the sensor. The invention thus relates to an optical measuring device having a monolithic, i.e., made in one single piece, sensor structure.

Manufacture of the monolithic structure can utilize, for example, known epitaxial material manufacturing methods, combined with selective etching methods, whereby sensors in accordance with the invention can be produced at low unit cost.

The optical wave conductor can be an integral part of the sensor or it can be a component (such as a light guide or optical fiber) associated with the monolithic structure.

BRIEF DESCRIPTION OF THE DRAWINGS

Some embodiments of position-measuring sensors in accordance with the invention will be exemplified, in greater detail, by way of example, with reference to the accompanying drawings, in which.

DESCRIPTION OF PREFERRED EMBODIMENTS

Figure 1:
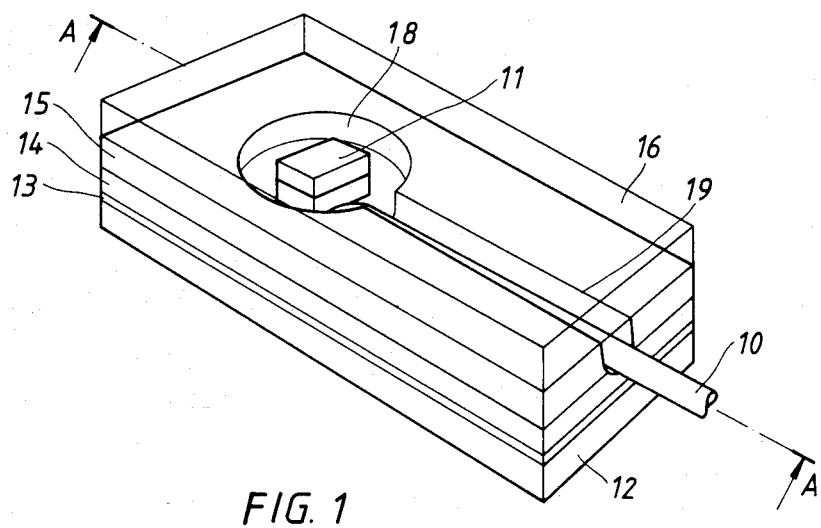
FIG. 1 is a perspective view of a first embodiment of sensor.
Figure 2:
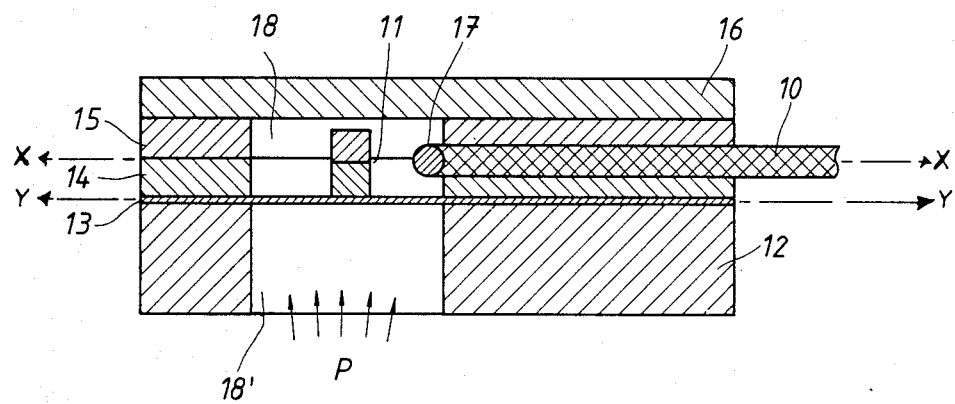
FIG. 2 is a section on the line A—A of FIG. 1.

FIGS. 1 and 2 show a first embodiment of sensor according to the invention. The numeral 10 designates a wave conductor, for example an optical fiber, which is employed for conducting exciting light to and luminescent light from, a movable body 11 of luminescent material.

The sensor comprises a monolithic structure which is formed of four layers 12, 13, 14 and 15. The lowermost layer (12) represents a substrate material which can be, for example, GaAs. Mounted on this substrate 12 is a thin layer 13 (e.g. $Al_yGa_{1-y}As$) which defines a resilient diaphragm. In its rest position this diaphragm extends in a plane Y—Y which is parallel to a center line X—X of the end portion of the wave conductor 10 in the monolithic structure (see FIG. 2). Next is a layer 14 of a first luminescent material (e.g. $Al_{x2}Ga_{1-x2}As$) and finally a layer 15 of a second luminescent material (e.g. $Al_{x2}Ga_{1-x2}As$). Preferably, each of the layers 14 and 15 made of $Al_xGa_{1-x}As$, wherein $0 \leq X \leq 1$. The layers in the monolithic structure may also contain $In_xGa_{1-x}As_yP_{1-y}$ or $In_xGa_{1-x}As$.

The layer 16 is a covering layer (e.g. of glass) which plays no part in the optical performance of the sensor and may be omitted. The monolithic structure 11–16 described above can be manufactured by standard methods which are used for manufacturing opto-electronic components, such as LPE, VPE, MOCVD or MBE. By an etching process, a circular recess 18 is provided in the layers 14, 15, but during the etching process part of the material near the center of the recess is masked from attack by the etch and is left as the body 11. It will be apparent that this body 11 includes superposed pieces of the layers 14 and 15 of different luminescent properties. In a similar manner, substrate material from the layer 12 is etched away from the other side of the diaphragm layer 13 to form a second recess 18'. By etching (or some other method) a groove 19 is provided for accommodating the wave conductor 10. The end of the optical wave conductor within the recess 18 is provided with a lens 17 (see FIG. 2), but this is not essential.

MODE OF OPERATION

The mode of operation of the sensor can best be described with reference to FIG. 2. Excitation light, from a remote electronic control unit (not shown) is fed to the sensor via the wave conductor 10 and illuminates the body 11 to cause the two layers thereof to luminesce. Due to the action of an external force, for example as a result of a fluid medium (liquid or gas) flowing into the second recess 18' and applying a pressure P on the diaphragm layer 13 in a perpendicular direction to plane Y—Y, the body 11 will be displaced relative to the lens 17. As a consequence of this movement of the body 11, the proportion of luminescent light coming from the two material layers 14 and 15 (having different luminescence properties) which is coupled back into the wave conductor 10 will thus be changed. Due to the elasticity of the diaphragm layer 13, the body 11 returns to its original position when the pressure P is removed. The control unit, by analysing the returning luminescent light, determines the magnitude of the movement of the body 11 and thus a measure of the pressure change P.

Figure 3:
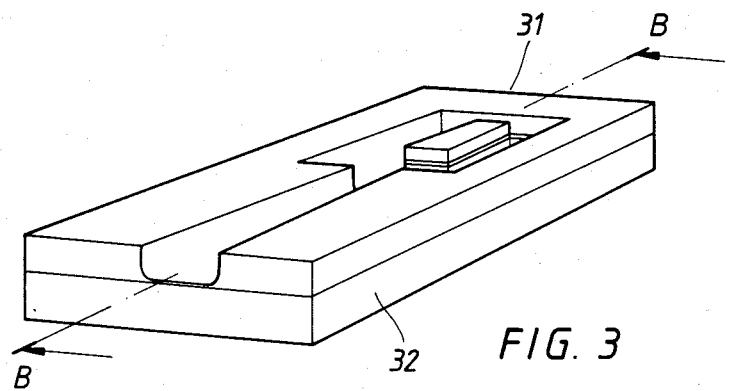
FIG. 3 is a perspective view of a second embodiment of sensor.
Figure 4:
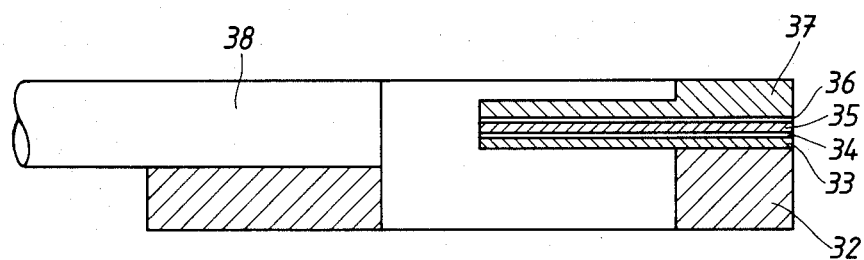
FIG. 4 is a section on the line B—B of FIG. 3.

A second embodiment of sensor structure is shown in FIGS. 3 and 4. In this embodiment, the elastic portion of the monolithic structure consists of a beam 31, provided with two layers 34 and 36 having different photoluminescence properties. 32 is a layer of substrate material, for example GaAs, on which epitaxial layers 33, 34, 35, 36 and 37 of $Al_xGa_{1-x}As$ have been grown. 38 (not shown in FIG. 3) is an optical fiber or, alternatively, a wave conductor structure of AlGaAs, which can be manufactured integrally with the substrate layer 32. The luminescent layers 34 and 36 are suitably made very thin, so that the light propagates therein only in a small number of modes (e.g. not more than ten). Suitably, these layers are also arranged in such a way that the emitted luminescence lies in a wavelength range in which the material has a low coefficient of absorption. This can be arranged by a substantially heavy doping of the material (AlGaAs) with, for example, Si or Ge. Doping with substances which give more deep-seated impurity levels, for example Mn in GaAs, also results in this effect. Any deflection of the beam 31 will cause the layers 34, 36 to flex relative to the fiber 38 and modify the properties of the composite luminescent light fed back into it.

Figure 5:
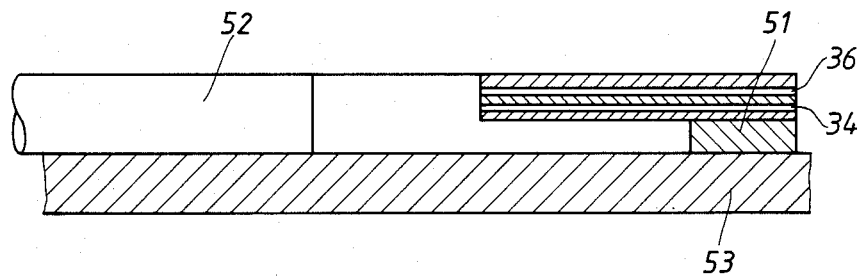
FIG. 5 shows, in a view similar to FIG. 4, a third embodiment of sensor.

A third possible embodiment of sensor is shown in FIG. 5. In this embodiment a monolithic structure 51 and an optical fiber 52 are attached to a carrier layer 53, for example of glass or Si. The layers 34 and 36 in FIG. 5 are again luminescent layers of different spherical properties.

The embodiments of sensors described above can be varied in many ways within the scope of the following claims.

What is claimed is:

1. An optical position-measuring sensor capable of determining the strength of an activating force which comprises a monolithic structure which includes a flexible diaphragm which in its rest position extends in a plane and which can be flexed in a direction perpendicular to said plane by an activating force, and two masses of luminescent material resting on said flexible diaphragm so as to be moved when said flexible diaphragm is flexed, said two masses of luminescent material emitting, on excitation, different characteristic spectra, and a wave guide, one end portion of said wave guide being stationarily mounted on said monolithic structure, said one end portion of said wave guide being straight and defining a center line which is parallel to said plane in which said flexible diaphragm extends in its rest position, said wave guide being capable of receiving luminescent light emitted by said two masses of luminescent material when excited, the wave guide and flexible diaphragm being positioned such that movement of said flexible diaphragm by an activating force which acts in a direction perpendicular to said plane causes said two masses to move relative to said one end portion of said wave guide, so as to change the proportion of luminescent light received by said wave guide from said two masses, so as to provide data from which the strength of said activating force is determined.

2. The optical position-measuring sensor as defined in claim 1, wherein said monolithic structure includes a plurality of layers of material having a passageway extending therethrough and wherein said flexible diaphragm extends across said passageway to divide it into a first recess on one side of said flexible diaphragm and a second recess on the other side of said flexible diaphragm, said second recess being capable of containing a fluid medium which applies an external force against said flexible diaphragm.

3. The optical position-measuring sensor as defined in claim 2, wherein said two masses of luminescent material are located on said flexible diaphragm so as to extend into said first recess, and wherein said sensor further includes a covering layer on said monolithic structure which encloses said first recess.

4. The optical position-measuring sensor as defined in claim 2, wherein said two masses of luminescent material consist of two layers of semi-conductor materials.

5. The optical position-measuring sensor as defined in claim 4, wherein said semi-conductor materials include $Al_xGa_{1-x}As_x$ where $0 \leq X \leq 1$.

6. The optical position-measuring sensor as defined in claim 4, wherein said layers of said monolithic structure include $In_xGa_{1-x}As_yP_{1-y}$.

7. The optical position-measuring sensor as defined in claim 4, wherein said layers of said monolithic structure include $In_xGa_{1-x}As$.

8. The optical position-measuring sensor as defined in claim 4, wherein a first of said two layers of semiconductor materials is located on said flexible diaphragm and the second of said two layers of semi-conductor materials is located on said first layer.

9. The optical position-measuring sensor as defined in claim 1, wherein said monolithic structure consists of at least three layers of material, at least one of said three layers of material being composed of a flexible material and the remaining two layers being each luminescent and located on the same side of said layer of flexible material.

10. An optical position-measuring sensor capable of determining the strength of an activating force which comprises monolithic structure which includes a flexible beam structure which in its rest position extends in a plane and which can be flexed in a direction perpendicular to said plane by an activating force, and two masses of luminescent material resting on said flexible beam structure so as to be moved when said flexible beam structure is flexed, said two masses of luminescent material emitting, on excitation, different characteristic spectra, and a wave guide, one end portion of said wave guide being stationarily mounted in said monolithic structure, said one end portion of said wave guide being straight and defining a center line which is parallel to said plane in which said flexible beam structure extends in its rest position, said wave guide being capable of receiving luminescent light emitted by said two masses of luminescent material when excited, the wave guide and flexible beam structure being positioned such that movement of said flexible beam structure by an activating force which acts in a direction perpendicular to said plane causes said two masses to move relative to said one end portion of said wave guide, so as to change the proportion of luminescent light received by said wave guide from said two masses, so as to provide data from which the strength of said activating force is determined.

11. The optical position-measuring sensor as defined in claim 10, wherein said monolithic structure includes a plurality of layers of materials having a passageway extending therethrough and wherein said flexible beam structure extends into said passageway so as to be flexed by the force of a fluid medium which is passed through said passageway.

12. The optical position-measuring sensor as defined in claim 11, wherein said two masses of luminescent material consist of two layers of semi-conductor materials.

13. The optical position-measuring sensor as defined in claim 12, wherein said semi-conductor materials include $Al_xGa_{1-x}As_x$ where $0 \leq X \leq 1$.

14. The optical position-measuring sensor as defined in claim 12, wherein said said layers of said monolithic structure include $In_xGa_{1-x}As_yP_{1-y}$.

15. The optical position-measuring sensor as defined in claim 12, wherein said said layers of said monolithic structure include $In_xGa_{1-x}As$.

16. The optical position-measuring sensor as defined in claim 10, wherein said monolithic structure consists of at least three layers of material, at least one of said three layers of material being composed of a flexible material and the remaining two layers being each luminescent and located on the same side of said layer of flexible material.

* * * * *